Feb. 13, 1951 W. J. GRUEN 2,541,818
RADIO RECEIVER
Filed Dec. 18, 1948
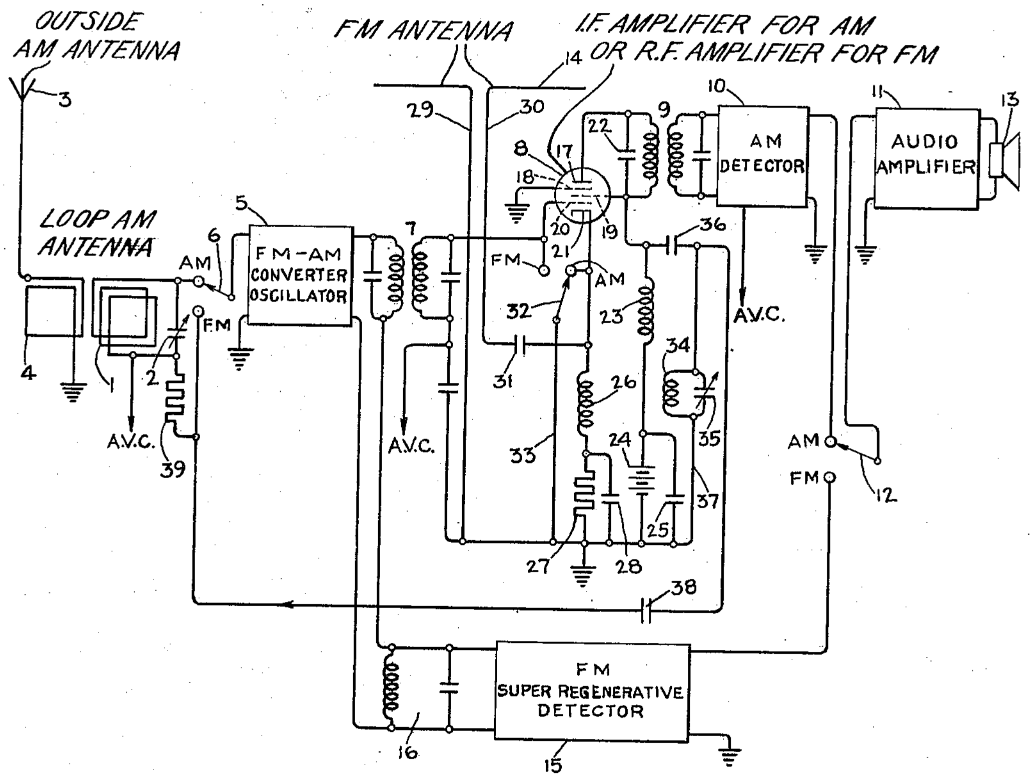
Inventor:
Wolf J. Gruen,
by Merton D. Morse
His Attorney.

Patented Feb. 13, 1951

2,541,818

UNITED STATES PATENT OFFICE 2,541,818

RADIO RECEIVER

Wolf J. Gruen, Syracuse, N. Y., assignor to General Electric Company, a corporation of New York Application December 18, 1948, Serial No. 66,024

10 Claims. (Cl. 250—20)

My invention relates to radio receivers and, more particularly, to radio receivers of the superheterodyne type which are adapted selectively to receive amplitude-modulated signals or frequency-modulated signals. It is a primary object of my invention to provide a new and improved amplitude-modulated and frequency-modulated signal receiver which is adapted for marketing in the lower price ranges.

In receivers adapted selectively to receive amplitude - modulated carrier wave energy throughout the standard broadcast band of approximately 500 to 1500 kc. or frequency-modulated carrier wave energy throughout the present frequency-modulation band of 88 to 108 megacycles, it has been the practice to provide a single converter-oscillator stage for both amplitude-modulated and frequency-modulated signals. While this arrangement is attractive from the cost standpoint it is desirable to obtain additional amplification of the frequency-modulated signal before it is applied to the converter stage. This additional amplification is especially important in the reception of frequency-modulated signals wherein it is desirable to increase the strength of the signal before it reaches the converter-oscillator stage in order to overcome the relatively high noise level thereof. The converter noise level is particularly objectionable in the pentagrid type of converter-oscillator stage, although from the cost aspect such a converter oscillator stage is desirable in a combination amplitude-modulated and frequency-modulated signal receiver. While it is possible to provide additional amplification by the use of a separate radio frequency amplifier, this solution, from a practical standpoint, would be out of the question in receivers designed for the lower price brackets.

Also, in combination amplitude-modulated and frequency-modulated signal receivers, particularly those which employ a super-regenerative detector to demodulate the frequency modulated carrier wave, considerable difficulty is experienced due to re-radiation of the signal frequency and other side band frequencies, which re-radiation can make the simultaneous operation of two or more neighboring receivers on the same signal frequency impossible. This re-radiation is especially noticeable in those combination receivers wherein the super-regenerative detector is not preceded by an isolating amplifier stage.

It is an object of my invention, therefore, to provide a new and improved superheterodyne receiver adapted selectively to receive amplitude-modulated signals or frequency-modulated signals in which one or more of the above-mentioned disadvantages of the arrangements of the prior art are eliminated.

It is a further object of my invention to provide a new and improved superheterodyne receiver adapted selectively to receive amplitude-modulated signals or frequency-modulated signals, in which substantial amplification of frequency-modulated signals is obtained by means of a dual-purpose signal translating stage in the receiver.

It is a still further object of my invention to provide a new and improved superheterodyne receiver adapted selectively to receive amplitude-modulated signals or frequency-modulated signals and employing a super-regenerative detector for frequency-modulated signals in which re-radiation from the receiver is substantially eliminated.

It is another object of my invention to provide a new and improved superheterodyne receiver adapted selectively to receive amplitude-modulated signals or frequency modulated signals in which a single signal-translating stage operates as a grounded cathode intermediate frequency amplifier when the apparatus is being utilized to receive an amplitude-modulated signal and as a grounded-grid radio frequency amplifier when the apparatus is being utilized to receive a frequency-modulated signal.

In accordance with the invention, in a superheterodyne receiver adapted selectively to receive amplitude-modulated signals or frequency-modulated signals, a dual-purpose signal-translating stage comprises an electron discharge device having at least a control electrode, a cathode, a screen electrode and an anode. The stage includes a first input circuit for applying amplitude-modulated signals at an intermediate frequency to the control electrode of the device and a second input circuit for applying frequency-modulated signals at carrier-frequency to the cathode of the device. An amplitude-modulation, intermediate frequency output circuit is connected between the anode and screen electrode of the device and a frequency-modulation radio frequency output circuit connects the screen electrode to the unidirectional source of potential for the stage. The stage includes circuit connections for causing the device to operate as a grounded-cathode amplifier and other circuit connections for causing the device to operate as a grounded grid amplifier. The stage also includes switch means operable in a first position to establish the first mentioned circuit connections during amplitude-modulated signal reception and operable in a second position to establish the second named circuit connections during frequency-modulated signal reception.

Also in accordance with the invention, my superheterodyne receiver, which is adapted selectively to receive frequency-modulated or amplitude - modulated signals, comprises an amplitude-modulated signal channel having in the order named: a radio frequency selecting and converting means for deriving from a selected received amplitude-modulated signal an intermediate frequency signal, intermediate frequency amplifying means, amplitude-modulation detection means and signal reproducing means coupled to the detection means. For frequency modulation reception the intermediate frequency amplifying means is operated as a grounded-grid radio frequency amplifier, the output of the grounded grid radio frequency amplifier being connected to the radio frequency selecting and converting means used for amplitude-modulated signal reception. A super-regenerative detector is connected from the output of the converting means to the signal reproducing means.

The novel features which are considered to be characteristic of my invention are set forth with particularity in the appended claims. My invention itself, however, both as to its organization and method of operation, together with further objects and advantages thereof, may be best understood by reference to the following description taken in connection with the accompanying drawings wherein the single figure theretof is a circuit diagram, partially schematic of a complete superheterodyne receiver embodying my invention.

Referring now to the drawing, there is shown, partially schematically, the circuit of a complete superheterodyne receiver adapted selectively to receive amplitude-modulated signals or frequency-modulated signals. This receiver comprises a radio frequency selecting and converting circuit which is effective to derive from a selected received radio frequency signal an intermediate frequency signal having a nominal carrier frequency of one value for amplitude modulated signals and of a substantially different value for frequency modulated signals. To receive amplitude modulated signals, I provide a loop antenna 1 which is tuned to the desired radio frequency by means of variable capacitor 2. To receive more distant radio stations an outside antenna 3 may be coupled by means of a primary winding 4 to the loop antenna 1. Amplitude modulated radio frequency signals selected in the loop circuit are supplied to the input circuit of a converter oscillator device indicated in block diagram form at 5, by means of a selector switch 6. In device 5, amplitude modulated radio frequency signals are converted to an amplitude modulated intermediate frequency wave and are supplied through an intermediate frequency transformer 7 to the control electrode of an electron discharge device 8. Device 8 operates as an amplitude modulation intermediate frequency amplifier and signals of intermediate frequency appear in amplified form across the secondary of an amplitude modulation intermediate frequency transformer 9. The amplified intermediate frequency is then detected in an amplitude modulation detector 10 and selectively applied to an audio amplifier 11 by means of a selector switch 12. The output of audio amplifier 11 is supplied to signal reproducing means 13 shown as a conventional loud speaker.

For reception of frequency modulation signals, an ultra high frequency antenna 14 is connected to the cathode circuit of device 8, this device then being operated as a radio frequency amplifier. Amplified radio frequency signals from the output of device 8 are selectively applied to the input circuit of converter oscillator device 5 by means of selector switch 6. The output circut of converter oscillator 5 is coupled to a superregenerative detector 15 by means of a resonant circuit 16 which is tuned to the nominal carrier frequency of the frequency modulation intermediate frequency signal supplied by converter device 5 during periods of frequency modulation reception. The output of superregenerative detector 15 is selectively supplied to audio amplifier 11 by means of selector switch 12.

Referring now more particularly to the portion of the receiver of Fig. 1 embodying my invention, device 8 is illustrated as a pentode type electron discharge device having an anode 17, suppressor electrode 18, screen electrode 19, control electrode 20 and cathode 21. Anode 17 is connected to the screen electrode 19 by means of a parallel combination comprising the primary of transformer 9 and intermediate frequency tuning capacitor 22. The screen electrode 19 is connected through an inductance 23 to a unidirectional source of potential indicated by the battery 24, this source of potential being by-passed by capacitor 25. The cathode 21 of device 8 is connected through an inductance 26 and a parallel combination of resistor 27 and capacitor 28 to ground. The ultra high frequency antenna 14, which is utilized for frequency modulation reception, is connected to the receiver by means of lead-in wires 29 and 30, lead-in wire 29 being connected to ground and lead-in wire 30 being connected to the cathode 21 of device 8 through a capacitor 31. The control electrode 20 and cathode 21 of device 8 are connected to stationary contacts of an FM-AM selector switch 32, the movable arm of which is connected to ground through lead 33. To select a particular received FM signal, an inductance 34 is connected in parallel with a variable capacitor 35, this tank circuit being closely coupled to inductance 23 by means of a capacitor 36. One side of inductance 34 is connected to ground through a lead 37, the other side of inductance 34 being connected by means of a condenser 38 to the frequency modulation contact of selector switch 6. A grid-leak resistor 39 is provided for the input circuit of converter-oscillator stage 5 during periods of frequency modulation reception.

Considering now the operation of the dual purpose signal translating device 8 during reception of amplitude modulated signals, the cathode 21 of this device is connected to ground by means of selector switch 32. Device 8 then operates in the manner of a conventional grounded-cathode intermediate frequency amplifier, and an intermediate frequency signal which is applied to control electrode 20 by means of input circuit 7 is derived in amplified form from the anode of device 8 by means of transformer 9. The inductive reactance of coil 23 at intermediate frequency signals is of extremely small value so that the screen electrode 19 may be considered as connected directly to the unidirectional source of potential 24 at these frequencies. It will be understood that during periods of amplitude-modulated signal reception an AVC voltage developed in amplitude modulation detector 10 may be applied to the control electrodes of converter oscillator device 5 and intermediate frequency amplifier 8 in the manner illustrated in the drawing.

To receive frequency modulated signals, the control electrode 20 of device 8 is connected to ground through selector switch 32. Frequency modulated signals which are received by the ultra high frequency antenna 14, which has been illustrated as a conventional di-pole antenna, are coupled to the cathode circuit of device 8, inductance 26 being tuned broadly by the circuit and tube capacities associated therewith to the frequency modulation band. A bias network comprising resistor 27 and capacitor 28 provides the necessary bias voltage for control electrode 20. At frequency modulation carrier wave frequencies, which may range from 88 to 108 megacycles, the capacitive reactance of capacitor 22 is extremely small so that anode 17 and screen electrode 19 may be considered as short circuited at these frequencies. The inductance 23 is self-resonant at the center of the frequency modulation band. Device 8 thus acts as a grounded-grid triode-connected radio frequency amplifier for frequency modulation signals, these signals being derived in amplified form from the screen electrode 19 and anode 17 which operate as the anode of the triode amplifier, the input circuit of the amplifier having sufficient band width to receive the entire frequency modulation band. To derive from the screen electrode 19 a particular received signal within the frequency modulation band, a parallel resonant circuit comprising inductance 34 and variable capacitor 35 is provided, this resonant circuit being closely coupled to inductance 23 by means of capacitor 36. It will be understood that the tuning shaft of variable capacitor 35 may be ganged with the shafts of the variable tuning capacitors of converter oscillator stage 5 to obtain a uni-control receiver in a manner well known to those skilled in the art.

Amplified frequency modulated carrier signals, which are selectively produced across parallel resonant circuit 34, 35, are connected through a condenser 38 and selector switch 6 to the input circuit of converter oscillator stage 5. The converter oscillator stage produces a frequency modulated intermediate frequency which is of substantially different value from the intermediate frequency produced during amplitude modulation reception, and the frequency modulated intermediate frequency signal is coupled by means of tuned circuit 16 to the superregenerative detector 15. While a conventional frequency modulation intermediate frequency amplifier and frequency modulation discriminator may be utilized in place of the superregenerative detector 15, I find it preferable to utilize a superregenerative detector to simplify the circuit of the receiver and to minimize the cost thereof. The superregenerative detector 15 may be of any conventional type.

From the above description of the invention it will be evident that in a superheterodyne receiver adapted selectively to receive amplitude modulated signals or frequency modulated signals a dual-purpose signal translating stage embodying my invention has the advantage of providing additional amplification of received frequency modulated signals before application thereof to a relatively high noise level converter input circuit. This additional amplification is obtained without increasing the number of tubes in the receiver and with very simple switching arrangements for selectively receiving amplitude modulated signals or frequency modulated signals.

It is also to be noted that a superheterodyne receiver embodying my invention has the additional advantage of substantially eliminating any re-radiation from the ultra high frequency antenna 14. Such re-radiation is particularly objectionable when a frequency modulation superregenerative detector is employed, this re-radiation being caused by coupling of the superregenerator intermediate frequency back to the converter oscillator device wherein it is reconverted to the original radio frequency. Re-radiation due to the superregenerative detector is substantially eliminated in a receiver constructed in accordance with the principles of my invention due to the fact that any small amount of reconverted radio frequency energy which is present in the input circuit of converter oscillator device 5 is further blocked from the antenna 14 by the voltage reduction obtained by device 8 which is operating as a radio frequency amplifier. Thus, two or more receivers constructed in accordance with the principles of my invention may be operated in close proximity to one another and may receive the same frequency modulation station without objectionable interference caused by a re-radiation from the superregenerative detector of any one of the receivers.

While the invention has been described by reference to a particular embodiment thereof, it will be understood that numerous changes and modifications may be made by those skilled in the art without departure from my invention. I therefore aim in the appended claims to cover all such changes and modifications as fall within the true spirit and scope of my invention.

What I claim as new and desire to secure by Letters Patent of the United States is:

1. In a dual purpose amplifier, the combination of an electron discharge device having an anode, a cathode, a control electrode and a screen electrode, a first input circuit for applying a signal wave of relatively low frequency between said control electrode and a point of reference potential, means for deriving from said anode said low frequency signal wave in amplified form, a second input circuit for applying a signal wave of relatively high frequency between said cathode and said reference point, means for deriving from said screen electrode said high frequency signal wave in amplified form, and switch means for selectively by-passing said first input circuit or said second input circuit for said high or low frequency respectively.

2. In a dual purpose amplifier, the combination of an electron discharge device having an anode, a cathode, a control electrode and a screen electrode, a first input circuit for applying a signal wave of relatively low frequency between said control electrode and a point of reference potential, means for deriving from said anode said low frequency signal wave in amplified form, a second input circuit for applying a signal wave of relatively high frequency between said cathode and said reference point, means for deriving from said screen electrode said high frequency signal wave in amplified from, and switch means for selectively by-passing said first input circuit and said second input circuit for said high or low frequency respectively, said first named means having a negligible impedance at said high frequency and said second named means having a negligible impedance at said low frequency.

3. In an amplifying system adapted selectively to amplify a first signal wave or a second signal wave, the frequency of said first signal wave being substantially different from the frequency of said second signal wave, the combination of an electron discharge device having at least an anode, a cathode, a control electrode and a screen electrode, a first input circuit for applying said first signal wave between the control electrode of said device and ground, a second input circuit for applying said second signal wave between the cathode of said device and ground, means connected between said anode and said screen electrode for deriving from said anode said first signal wave in amplified form, means connected between said screen electrode and ground for deriving from said screen electrode said second signal wave in amplified form, and switch means for selectively short-circuiting said first input circuit or said second input circuit to cause said device to operate respectively as a grounded cathode amplifier or a grounded grid amplifier.

4. A superheterodyne receiver adapted selectively to receive amplitude modulated signals or frequency modulated signals comprising, a radio frequency selecting and converting means for deriving from a selected received radio frequency signal an intermediate frequency signal, a superregenerative detector coupled to the output circuit of said converting means, a dual purpose signal translating stage coupled to the output circuit of said converting means and including circuit connections for causing said stage to operate as a grounded-cathode intermediate frequency amplifier and other circuit connections for causing said stage to operate as a grounded-grid radio frequency amplifier, switch means operable in a first position to establish said first mentioned circuit connections during amplitude modulated signal reception and operable in a second position to establish said last named circuit connections during frequency modulated signal reception, and means connecting the output of said signal translating stage to the input of said converting means during periods of frequency modulated signal reception whereby re-radiation from said receiver of undesired signals produced by said superregenerative detector is substantially eliminated.

5. In a superheterodyne receiver adapted selectively to receive amplitude-modulated signals or frequency-modulated signals, a dual-purpose signal translating stage comprising an electron discharge device having an anode, a cathode, a control electrode and a screen electrode, means for applying an amplitude-modulated intermediate frequency signal between the control electrode of said device and a point of reference potential, means for deriving from the anode of said device said intermediate frequency signal in amplified form, means for applying between the cathode of said device and said point a received frequency-modulated signal means for deriving from the screen electrode of said device said received frequency modulated signal in amplified form, a circuit element of low impedance at the frequencies of said signals, and switching means for selectively connecting said element between said control electrode and point or between said cathode and point.

6. In a superheterodyne receiver adapted selectively to receive amplitude-modulated signals or frequency-modulated signals and including means for deriving from a received amplitude-modulated signal an intermediate frequency signal substantially different in frequency from a received frequency-modulated signal, a dual purpose signal translating stage comprising an electron discharge device having an anode, a cathode, a control electrode and a screen electrode, means for applying said intermediate frequency signal between the control electrode of said device and ground, means for deriving from the anode of said device said intermediate frequency signal in amplified form, means for applying between the cathode of said device and ground a received frequency-modulated signal, means for deriving from the screen electrode of said device said received frequency-modulated signal in amplified form, a circuit element of low impedance at the frequencies of said signals, and means for selectively connecting said element between said control electrode and point or between said cathode and point, whereby said device operates as a grounded cathode intermediate frequency amplifier for amplitude-modulated intermediate frequency signals and as a grounded-grid radio frequency amplifier for received frequency modulated signals.

7. In a superheterodyne receiver adapted selectively to receive amplitude-modulated signals or frequency-modulated signals and including means for deriving from a received amplitude-modulated signal an intermediate frequency signal substantially different in frequency from a received frequency-modulated signal, a dual purpose signal translating stage comprising an electron discharge device having an anode, a cathode, a control electrode and a screen electrode, first input means for applying said intermediate frequency signal between the control electrode of said device and a point of reference potential, means for deriving from the anode of said device said intermediate frequency signal in amplified form, second input means for applying between the cathode of said device and said point a band of received frequency modulated signals, means for selectively by-passing said control electrode to said point for frequency modulated signals or by-passing said cathode to said point for intermediate frequency signals, and means for selectively deriving from the screen electrode of said device a desired frequency-modulated signal in said frequency band in amplified form, said last named means comprising an inductance connected to said screen electrode, a parallel resonant circuit tunable to said desired frequency-modulated signal and a capacitor connected between said screen electrode and said parallel resonant circuit, whereby said parallel resonant circuit is closely coupled to said inductance.

8. In a superheterodyne receiver adapted selectively to receive amplitude-modulated signals or frequency-modulated signals and including means for deriving from a received amplitude-modulated signal an intermediate frequency signal substantially different in frequency from a received frequency-modulated signal, a dual purpose signal translating stage comprising an electron discharge device having an anode, a cathode, a control electrode and a screen electrode, first input means for applying said intermediate frequency signal between the control electrode of said device and ground, means for deriving from the anode of said device said intermediate frequency signal in amplified form, second input means for applying between the cathode of said device and ground a band of received frequency modulated signals and means for selectively deriving from the screen electrode of said device a desired frequency-modulated signal in said frequency band in amplified form, said last named means comprising at least one parallel resonant circuit tunable to said desired frequency-modulated signal.

9. In a superheterodyne receiver adapted selectively to receive amplitude-modulated signals or frequency-modulated signals and including means for deriving from a received amplitude-modulated signal an intermediate frequency signal substantially different in frequency from a received frequency-modulated signal, a dual purpose signal translating stage comprising an electron discharge device having an anode, a cathode, a control electrode and a screen electrode, means for applying said intermediate frequency signal between the control electrode of said device and a point of reference potential, means for deriving from the anode of said device said intermediate frequency signal in amplified form, means for applying between the cathode of said device and said point a received frequency-modulated signal, means for deriving from the screen electrode of said device said received frequency modulated signal in amplified form, and switching means for selectively short-circuiting either said control electrode applying means or said cathode applying means.

10. In a superheterodyne receiver adapted selectively to receive amplitude-modulated signals or frequency-modulated signals and including means for deriving from a received amplitude-modulated signal an intermediate frequency signal substantially different in frequency from a received frequency-modulated signal, a dual purpose signal translating stage comprising an electron discharge device having an anode, a cathode, a control electrode and a screen electrode, a first input circuit for applying said intermediate frequency signal between said control electrode and ground, means for deriving from said anode said intermediate frequency signal in amplified form, a second input circuit for applying a received frequency-modulated signal between said cathode and ground, means for deriving from said screen electrode said frequency-modulated signal in amplified form, selective circuit connections for effectively by-passing said second input circuit so as to cause said device to operate as a grounded cathode amplifier and other selective circuit connections for effectively by-passing said first input circuit so as to cause said device to operate as a grounded grid amplifier, and switch means operable in a first position to establish said first mentioned circuit connections during amplitude-modulated signal reception and operable in a second position to establish said last named circuit connections during frequency-modulated signal reception.

WOLF J. GRUEN.

REFERENCES CITED

The following references are of record in the file of this patent:

UNITED STATES PATENTS

| Number | Name | Date |
|---|---|---|
| 2,022,805 | Farnham | Dec. 3, 1935 |
| 2,230,546 | Rothe | Feb. 4, 1941 |
| 2,308,280 | Green | Jan. 12, 1943 |
| 2,474,978 | Holland | July 5, 1949 |